United States Patent [19]

Melling et al.

[11] 4,104,608
[45] Aug. 1, 1978

[54] HEAVE METER

[75] Inventors: Norman D. Melling; John J. De Matteo, both of Doylestown; Melvyn A. Levrant, Holland, all of Pa.; Ronald J. Juels, Freeport, N.Y.

[73] Assignee: The United States of America as represented by the Secretary of the Navy, Washington, D.C.

[21] Appl. No.: 782,661

[22] Filed: Mar. 30, 1977

[51] Int. Cl.$^2$ ................................................. G01S 9/66
[52] U.S. Cl. ............................... 340/3 PS; 73/170 A; 340/3 R
[58] Field of Search .................. 340/3 PS; 73/382 G, 73/170 A

[56] References Cited

U.S. PATENT DOCUMENTS 3,769,838  11/1963  Buckler ............................. 73/170 A

OTHER PUBLICATIONS

Sothcott et al., *Proceedings of the Conference on Electrical Engineering in Ocean Technology*, pp. 159-174.

*Primary Examiner*—Richard A. Farley
*Attorney, Agent, or Firm*—R. S. Sciascia; Henry Hansen

[57] ABSTRACT

A contour mapping system including compensation for the heave or vertical displacement of a ship due to wave and swell effects, and for correcting errors due to such effects in depth or bottom contour measurements of a body of water. Vertical acceleration A(s) of the ship, measured by a gravity meter accelerometer, is filtered according to the following Laplace transform equation by a cascaded series of filters to yield ship vertical displacement $\Delta D(s)$ due solely to heave:

$$\Delta D(s) = \frac{\tau_g \frac{s}{(\omega_f^2)} A(s)}{(\tau_g s + 1)(\frac{s^2}{\omega_f^2} + \frac{2\zeta s}{\omega_f} + 1)(\tau_f s + 1)}$$

where:
$\tau_g$ = gravity meter filter breakpoint
$\omega_f$ = filter transfer function breakpoint frequency
$\zeta$ = filter transfer function damping constant
$\tau_f$ = filter transfer function cut-off breakpoint This series of filters accomplishes attenuation of noise, such as is caused by gravity, vertical coriolis, vertical vibration or electrical noise, in the acceleration signal, and double integration of the remaining acceleration signal. The displacement signal is then provided to the processor or system being used for depth measurement or contour mapping, so that the individual measurements made therewith are corrected for ship heave occurring during those measurements.

8 Claims, 2 Drawing Figures

HEAVE METER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to apparatus for underwater depth measurement or contour mapping, and more particularly to apparatus for measurement of ship heave and for correction of underwater depth or contour mapping measurements therewith.

When a mobile vessel, such as a ship, floating on the surface of a body of water is used to determine the depth of that body of water, or to accomplish contour mapping of the bottom of that body of water, inaccuracies can result because of waves or swells on the surface of the water. These wave and swell effects can cause vertical displacement, hereinafter referred to as heave, of the ship or other vessel. Such contour plotting can be accomplished by transmitting a sonar, radar or other signal from the ship or other vessel vertically into the water to be bounced off the bottom of the body of water and returned to the ship for reception. Assuming constant velocity of the signal through the water, measurement of the depth of the body of water as the distance between the ship bottom and the water bottom at the surface location of the ship or other vessel can be accomplished by measuring the time delay between transmission and reception of the signal. However, if the ship or other vessel is vertically displaced above or below the normal surface of the body of water by wave or swell effects, this vertical displacement will be included in the measured depth. Accordingly, such depth measurements should be corrected to eliminate the effect of ship heave. Previous heave correction devices have employed a shipboard accelerometer to measure and produce a signal indicating ship vertical acceleration, which signal is then double integrated to produce displacement. However, such acceleration signals include noise, such as is caused by gravity, vertical coriolis, vertical vibration and electrical noise. This noise would, along with the portion of the acceleration signal attributable to heave, also be double integrated and included in the correction signal applied to the depth measurement, thereby causing error in the corrected depth measurement.

SUMMARY OF THE INVENTION

Accordingly, it is the general purpose of the present invention to provide a heave measurement and correction system.

Other objects of the present invention are to provide a system capable of measuring heave of a ship or other vessel disposed on the surface of a body of water, eliminating error due to noise from such measurement, increasing accuracy in heave measurement, and producing a signal indicating heave and having the proper phase angle.

Further objects of the present invention are to provide a contour mapping system with heave correction capable of compensating for wave and swell effects in depth or contour mapping measurements from such a vessel and increasing accuracy of depth and contour mapping measurements.

Briefly, these and other objects of the invention are accomplished by a heave meter for a contour mapping or depth measurement system. The heave meter includes a cascaded series of filters which receives and filters the signal $(A(s)/\tau_g s + 1)$ by a gravity meter, and produces a signal representative of heave $\Delta D(s)$, and provides the heave signal as a correction signal to a contour mapping or depth measuring device to compensate for variations in measured depth due to heave, according to the function:

$$\Delta D(s) = \frac{\tau_g \dfrac{s}{(\omega_f^2)} A(s)}{(\tau_g s + 1)\left(\dfrac{s^2}{\omega_f^2} + \dfrac{2\zeta s}{\omega_f} + 1\right)(\tau_f s + 1)}$$

where:
$s$ = complex Laplace transform operator
$\tau_g$ = gravity meter filter breakpoint
$\omega_f$ = filter transfer function breakpoint frequency
$\zeta$ = filter transfer function damping constant
$\tau_f$ = filter transfer function cut-off breakpoint This series of filters removes attenuation of heave-bearing frequency signals caused by the gravity meter filter, attenuates those portions of the acceleration signal $A(s)$ constituting noise, double integrates the remaining signal to produce a heave displacement signal, and assures a proper phase angle for the produced heave signal.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
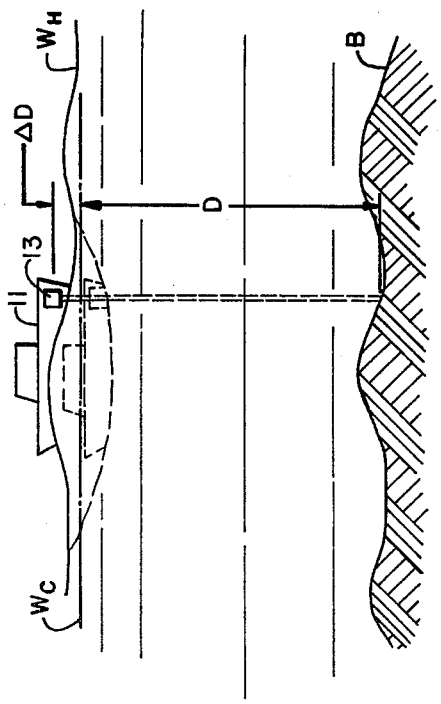
FIG. 1 shows in a sectional view a body of water having a bottom and waves, swells and other disturbances at its surface, and a ship disposed on the surface of the body of water shown in solid and skeleton views indicating displacement or heave of the ship due to such surface disturbances.

Referring now to the drawings, wherein like reference characters designate or like or corresponding parts throughout the several views, there is shown in FIG. 1 a ship 11 disposed on the disturbed surface $W_H$ of a body of water and provided with a sonar processor 13 for depth measurement of the body of water. Sonar processor 13 transmits into the water in a downward vertical direction a signal which is bounced off the bottom B of the body of water and is returned to the sonar processor for the purpose of measuring the depth D of the body of water at a certain point. As ship 11 moves along surface $W_H$, a series of depth measurements using sonar processor 13 can produce a map or plot of the contour of bottom B. However, waves and swells on the surface S can raise ship 11 well above sea level. However, waves, swells and other disturbances on the surface S can vary the vertical position of the ship 11 with respect to bottom B by an amount $\Delta D$ above or below the surface $W_C$ of the water present when the water is calm. Thus, sonar processor 13 would measure $D \pm \Delta D$, the distance between ship 11 experiencing heave and bottom B, and not time depth D. The variation in ship vertical displacement ΔD, hereinafter referred to as heave, due to surface $W_H$ waves, swells and other disturbances can be sufficiently substantial so as to introduce considerable inaccuracies into depth measurement by sonar processor 13.

Figure 2:
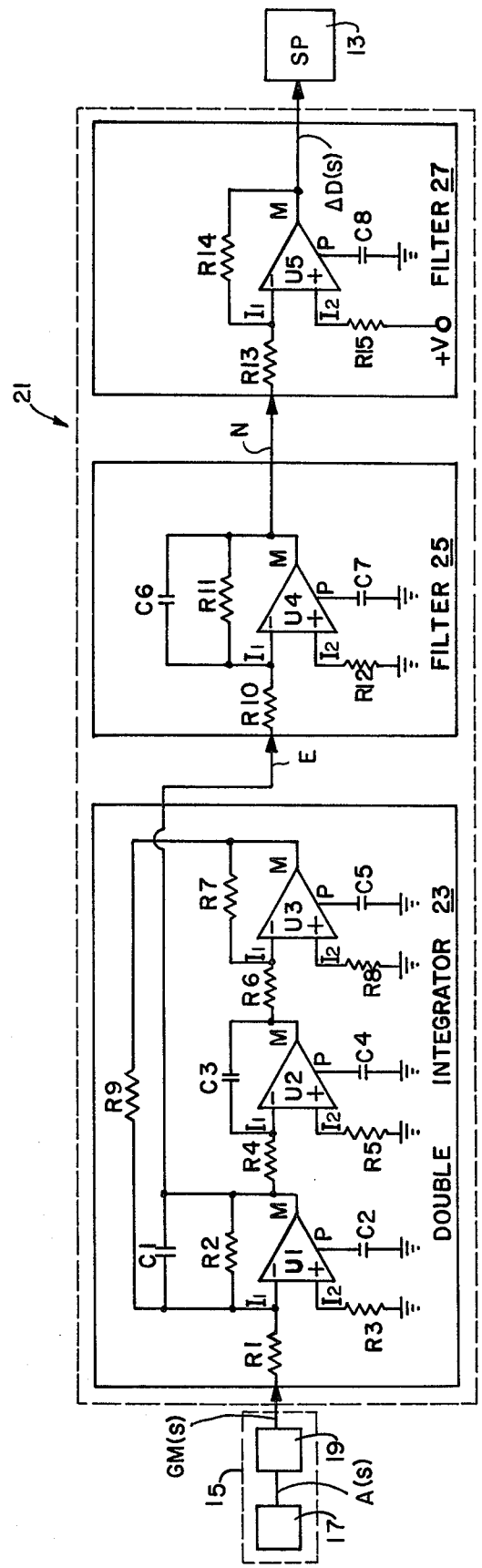
FIG. 2 is a schematic diagram of a contour mapping system with heave correction according to the present invention installed in the ship of FIG. 1.

As shown in FIG. 2, in order to account for heave, filter 21 receives and filters the signal produced by shipboard gravity meter 15 to produce a correction signal ΔD(s) indicative of heave which is provided to sonar processor 13. Gravity meter 15 includes a highly accurate vertically stabilized accelerometer 17 which senses all vertical acceleration experienced by ship 11, including that due to gravity, vertical coriolis, heave, and vertical vibration, plus electrical noise, and produces a ship vertical acceleration signal A(s). The variation in vertical acceleration due to gravity changes has a very low frequency characteristic compared with vertical coriolis, heave, vertical vibration and electrical noise. Accordingly, gravity meter 15 also includes a filter 19 which filters the acceleration signal from accelerometer 17 according to the Laplace transform transfer function $(1/\tau_g s + 1)$ which attenuates the higher frequency signals, having frequencies greater than $(1/\tau_g)$, which contain the latter components and not gravity information. Thus, gravity meter 15 produces a signal GM(s) indicative of gravity acting on ship 11.

Vertical acceleration A(s) of ship 11, measured by gravity meter accelerometer 17, is filtered in the present invention according to the following Laplace transform equation to yield ship vertical displacement ΔD(s) due solely to heave:

$$\Delta D(s) = \frac{\tau_g \frac{s}{(\omega_f^2)} A(s)}{(\tau_g s + 1)(\frac{s^2}{\omega_f^2} + \frac{2\zeta s}{\omega_f} + 1)(\tau_f s + 1)}$$

where:
$s$ = complex Laplace transform operator
$\tau_g$ = gravity meter filter 19 breakpoint
$\omega_f$ = filter 21 transfer function breakpoint frequency
$\zeta$ = filter 21 transfer function damping constant
$\tau_f$ = filter 21 transfer function cut-off breakpoint
This equation can be rewritten as:

$$\Delta D(s) = \left[\frac{A(s)}{\tau_g s + 1}\right]\left[\frac{\frac{s}{\omega_f^2}}{\left(\frac{s^2}{\omega_f^2} + \frac{2\zeta s}{\omega_f} + 1\right)}\right]\left[\frac{1}{s + \frac{1}{\tau_f}}\right]\left[\frac{\tau_g}{\tau_f}\right]$$

$$= GM(s) \cdot DI(s) \cdot F_1(s) \cdot F_2(s)$$

where GM(s) is the signal produced by gravity meter 15.

Further information on heave is given in Palsson, T., Melling, N. and O'Halloran, W. F., Jr. *Heave Motion Estimation.* In *Proceedings of the International Symposium on Applications of Marine Geodesy.* Washington, D. C., Marine Technology Society, 1974, p. 429–439.

To remove the attenuation by filter 19 of the heave-bearing signals, and produce a heave signal for ship 11 which is free of errors due to noise, filter 21 has a Laplace transform transfer function of DI(s) · $F_1(s)$ · $F_2(s)$. Filter 21 compensates for gravity meter filter 19, double integrates the acceleration signal, adjusts the phase shift of the resulting displacement signal to the proper phase angle, and attenuates noise from the signal to produce an accurate heave displacement signal. For implementation of the transfer function for filter 21, the function can first be broken down into three components, DI(s), $F_1(s)$ and $F_2(s)$. Each of these three components would then be accomplished by a separate filter, the resulting series of filters being connected in cascade to gravity meter filter 19. Thus, filter 21 includes double integrator 23 having transfer function DI(s), filter 25 having transfer function $F_1(s)$ and filter 27 having transfer function $F_2(s)$. The signal GM(s) produced by gravity meter 15 passes through and is filtered by double integrator 23, filter 25 and filter 27 in sequence, after which the resulting heave signal ΔD(s) is provided to sonar processor 13 as a correcting signal, as shown in FIG. 2.

The sign of ΔD(s) indicates its direction. A positive sign indicates upward heave increasing the distance between ship 11 and bottom B. This sign is provided by the sign of A(s) which is also indicative of direction, as processed by filter 21. Since filter 21 double integrates acceleration, the sign of A(s) for acceleration in an upward direction is negative. ΔD(s) provided to sonar processor 13 is subtracted from the depth readings made by the sonar processor.

The $\tau_g s$ term in the numerator of the ΔD(s) equation removes the attenuation performed by gravity meter filter 19, so that heave-bearing signals are not attenuated. The "s" portion of this term, included in the numerator of transfer function DI(s) of double integrator 23, provides the filter 21 transfer function with a zero at d.c., in order to reverse the effect of gravity meter filter 19, so that the heave frequency signals are recovered and the low frequency gravity variations, vertical coriolis and other low frequency contaminants to heave are attenuated.

Double integrator 23 also accomplishes double integration of acceleration to produce a double integrated output signal E indicative of displacement, according to the following portion of DI(s):

$$\frac{\frac{1}{\omega_f^2}}{\frac{s^2}{\omega_f^2} + \frac{2\zeta s}{\omega_f} + 1} = \frac{1}{s^2 + 2\zeta\omega_f s + \omega_f^2}$$

Although a filter having a transfer function of $(1s^2)$ would have accomplished double integration of a signal passed therethrough, for a direct current signal, wherein $s = 0$, the transfer function would have become infinite. Accordingly, DI(s) is used to avoid this problem, so that the poles of the double integration portion of the function DI(s) shown above are now at $-\zeta\omega_f \pm j\omega_f\sqrt{1 - \zeta^2}$ instead of zero, the function value for direct current signals is $(1/\omega_f^2)$, and the function has an absolute value maximum gain over the range of reasonably expected input signals (wherein $s = j\omega$) of $(1/2\omega_f^2\zeta\sqrt{1 - \zeta^2})$.

Filter 25 having transfer function $F_1(s)$ receives the displacement signal E produced by filter 21 and produces an output signal N having the proper phase angle over the heave frequencies (1/16 to ¼ Hz), which is −180° for a double integration. Filter 25 also attenuates signals having frequencies over $(1/\tau_f)$, such as vertical vibration, electrical noise and other undesirable signals.

Values for the parameters of the ΔD(s) equation given below are merely considered illustrative of one embodiment and are not to be construed as limiting:

$\tau_g = 22.5$ seconds
$\omega_f = 0.075$ radians/second
$\zeta = 0.5$
$\tau_f = (1/6.5$ radians/second$)$ Values for filter 21 are presented in the table below for the parameter values given above; however, these values are merely considered illustrative of one embodiment and are not to be construed by way of limitation.

TABLE

| Component | Value | Component | Value |
|---|---|---|---|
| R1, R3, R5, R12 | 1M ohms, 1% | R15 | 9.8k ohms, 1% |
| R2, R4 | 1.33M ohms, 1% | C1, | 1μF, 1% |
| R6, R7 | 10K ohms, 1% | C2, C4, C5 | 100pF, 5% |
| R8 | 4.99K ohms, 1% | C3 | 10μF, 1% |
| R9 | 1.3M ohms, 1% | C6, | 1μF, 1% |
| R10 | 150K ohms, 1% | C7, C8 | 100pF, 5% |
| R11 | 154K ohms, 1% | U1, U2, U3, U4, U5 | LM308N* or equiv. |
| R13 | 10K ohms, 1% | V | 2.95mV |
| R14 | 54K ohms | | |

*The National Semiconductor Corporation LM308N operational amplifier is described in Linear Data Book, Santa Clara, California, National Semiconductor Corp., June 1976, p. 3–114 to 3–118. For this device, the following pins correspond to the terminals shown in FIG. 2: 2 = I₁; 3=3–I₂; 6-M; 8 = P.

An initial gain of 4 to 1 is provided by an operational amplifier or other amplifier to the signal provided to filter 21. This gain, combined with the gains provided by filter 25 $(1/(R_{10}C_6) = 6.67)$ and filter 27 $(R_{14}/R_{13} = 5.4)$ yields the required gain of $\tau_g/\tau_f = 146.25$ for this example produce the desired output signal ΔD(s).

It should be understood that this heave meter can be used with depth measuring or contour mapping devices other than sonar processors. Also, this heave meter can be used with other gravity meters having other breakpoints.

Tus there Thus been provided a novel heave meter which is capable of measuring heave of a ship or other vessel disposed on the surface of a body of water. This heave meter can be used for correcting error in depth measurements from such a vessel due to heave of the vessel. Also, this heave meter is capable of attenuating noise and error due to noise, such as is caused by gravity, vertical coriolis, vertical vibration and electrical noise from such heave measurement. In addition, this heave meter is capable of measuring the vertical displacement of a ship due to wave and swell effects accurately, producing a heave correction signal having a proper phase angle, increased accuracy in heave measurement, and increased accuracy of a depth measurement.

Obviously, many modifications and variations of the present invention are possible in light of the above teachings. It is therefore to be understood that within the scope of the appended claims the invention may be practiced otherwise than as specifically described.

What is claimed is:

1. A contour mapping system for measuring bottom elevation from a ship, with heave compensation, comprising:

gravity metering means for producing a signal GM(s) indicative of gravity at the ship, including accelerometer means for measuring the vertical acceleration, and frequency compensating means for attenuating non-gravimetric frequencies;

heave metering means connected to receive said signal GM(s) for producing a signal ΔD(s) indicative of the heave displacement including integrator means adapted to receive a gravity meter output signal GM(s) for producing an output signal E indicative of the relationship $$[G]\, GM(s) \left[ \frac{\frac{S}{\omega_f^2}}{\frac{S^2}{\omega_f^2} + \frac{2\zeta S}{\omega_f} + 1} \right]$$

where:
$s$ = complex Laplace transform operator,
$\omega_f$ = filter transfer function breakpoint frequency,
and
$\zeta$ = filter transfer function damping constant;

first filter means connected to receive said integrator means output signal E for producing an output signal N indicative of the relationship $$[M]\, E \left[ \frac{1}{S + \frac{1}{\tau_f}} \right]$$

where
$\tau_f$ = filter transfer function cutoff breakpoint; and second filter means connected to receive said first filter means output signal for producing an output signal ΔD(s) indicative of heave displacement according to the relationship $$N \left[ \frac{\tau_g}{\tau_f} \right]$$

where
$\tau_g$ = gravity meter breakpoint; and depth measuring means connected to receive said signal ΔD(s) for producing a signal indicative of the heave compensated vertical distance from the ship to the bottom.

2. A contour mapping system according to claim 1 wherein said integrator means comprises:

first feedback amplifier means connected to receive said gravity meter output signal GM(s) and a feedback signal for producing a double integrated output signal E; the feedback impedance being a function of $\zeta \omega_f$; and second feedback amplifier means connected to receive said double integrated output signal E and producing said feedback signal.

3. A contour mapping system according to claim 1 wherein said first filter means comprises:

third feedback amplifier means connected to receive said first amplifier means output signal E and producing said signal N, the feedback impedance being a function of $(1/\tau_f)$.

4. A contour mapping system according to claim 1 wherein said second filter means comprises:
fourth feedback amplifier means connected to receive said first filter means output signal N and producing said output signal $\Delta D(s)$.

5. A heave meter for measuring the vertical displacement of a ship due to wave and swell effects, comprising:
integrator means adapted to receive a gravity meter output signal GM(s) for producing an output signal E indicative of the relationship $$[G]\, GM(s) \left[ \frac{\dfrac{S}{\omega_f^2}}{\dfrac{S^2}{\omega_f^2} + \dfrac{2\zeta S}{\omega_f} + 1} \right]$$

where:
s = complex Laplace transform operator,
$\omega_f$ = filter transfer function breakpoint frequency, and
$\zeta$ = filter transfer function damping constant;
first filter means connected to receive said integrator means output signal E for producing an output signal N indicative of the relationship $$[M]\, E \left[ \frac{1}{S + \dfrac{1}{\tau_f}} \right]$$

where
$\tau_f$ = filter transfer function cutoff breakpoint; and
second filter means connected to receive said first filter means output signal for producing an output signal $\Delta D(s)$ indicative of heave displacement according to the relationship $$N \left[ \frac{\tau_g}{\tau_f} \right]$$

where
$\tau_g$ = gravity meter filter breakpoint.

6. A heave meter according to claim 5 wherein said integrator means comprises:
first feedback amplifier means connected to receive said gravity meter output signal GM(s) and a feedback signal for producing a double integrated output signal E; the feedback impedance being a function of $\zeta \omega_f$; and
second feedback amplifier means connected to receive said double integrated output signal E and producing said feedback signal.

7. A heave meter according to claim 5 wherein said first filter means comprises:
third feedback amplifier means connected to receive said first amplifier means output signal E and producing said signal N, the feedback impedance being a function of $(1/\tau_f)$.

8. A heave meter according to claim 5 wherein said second filter means comprises:
fourth feedback amplifier means connected to receive said first filter means output signal N and producing said output signal $\Delta D(s)$.

* * * * *

UNITED STATES PATENT AND TRADEMARK OFFICE
CERTIFICATE OF CORRECTION

PATENT NO. : 4,104,608
DATED : August 1, 1978
INVENTOR(S) : Norman D. Melling et al It is certified that error appears in the above—identified patent and that said Letters Patent are hereby corrected as shown below:

Column 6, line 6, "[G] GM(s)" should be -- GM(s) --.

Column 6, line 34, "[M] E" should be -- E --.

Column 7, line 17, "[G] GM(s)" should be -- GM(s) --.

Column 7, line 32, "[M] E" should be -- E --.

Signed and Sealed this

Thirteenth Day of March 1979

[SEAL]

Attest:

RUTH C. MASON
*Attesting Officer*

DONALD W. BANNER
*Commissioner of Patents and Trademarks*